Jan. 30, 1951
J. W. MORSE ET AL
2,539,587
MOISTURE ABSORBING DEVICE
Filed Dec. 12, 1945
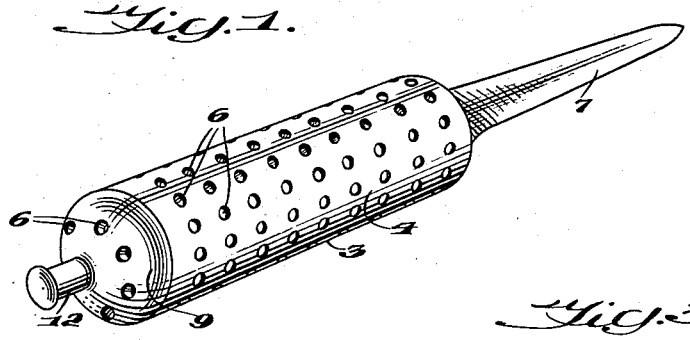
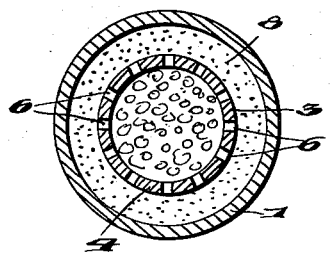
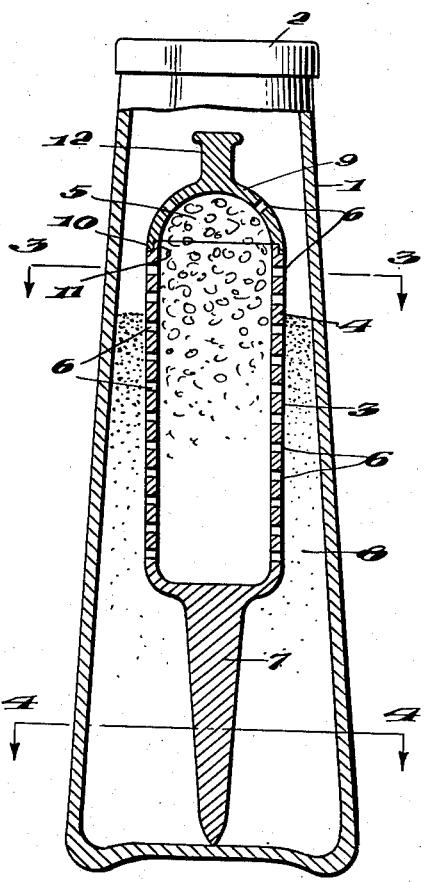
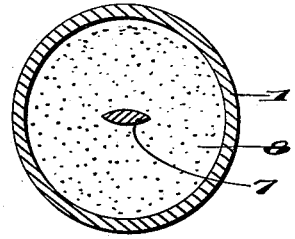
Inventors
JOHN W. MORSE,
JOSEPH PEARLSTEIN,
By Ritter, Mechlin & Munir
their Attorneys

UNITED STATES PATENT OFFICE 2,539,587

MOISTURE ABSORBING DEVICE

John W. Morse, Westmoreland Hills, Md., and
Joseph Pearlstein, Arlington, Va.

Application December 12, 1945, Serial No. 634,604

2 Claims. (Cl. 299—24)

The invention relates to moisture absorbing devices and more particularly to moisture absorbing devices for use in salt and other condiment shakers.

The principal object of the invention is to provide a durable device which may be readily inserted in a salt shaker and will effectively absorb the moisture therein to prevent the salt from caking irrespective of the general atmospheric condition.

A primary feature of the invention consists in providing a device having a body portion for receiving a moisture absorbing agent with a depending foot or tail which is adapted to engage the bottom of the salt shaker and support the body portion at such elevation that perforations formed in the upper portion thereof will be disposed above the level of the salt within the shaker.

Another feature of the invention consists in providing a device having a body portion for receiving a moisture absorbing agent with oppositely projecting members one of which is adapted to engage the bottom of the salt shaker to support the body portion in such manner that perforations in the upper portion thereof will be disposed above the level of the salt within the shaker, and the other of which is adapted to engage the top of the salt shaker when it is inverted to prevent the body portion from closing the usual perforations in the salt shaker cap.

Other and more specific features of the invention, residing in advantageous forms, combinations and relations of parts, will hereinafter appear and be pointed out in the claims.

In the drawings;

Figure 1 is a perspective view of the moisture absorbing device.

Figure 2 is a view, partly in section and partly in elevation, showing the moisture absorbing device within a salt shaker.

Figures 3 and 4 are sectional views taken on lines 3—3 and 4—4 respectively of Figure 2.

Referring more particularly to the drawings, indicates a salt shaker which may be of any conventional design or form having the usual cap 2 which is formed with perforations (not shown) through which salt is discharged from the shaker. The moisture absorbing device designated 3 is loosely confined within the shaker, as shown in Figure 2.

The device comprises a body 4 for receiving or housing a moisture absorbing agent 5, which is preferably in the form of a granular non-deliquescent material. The body which may advantageously be in the form of a hollow cylinder is provided throughout its entire length with a plurality of perforations 6.

Extending from the lower end of the body 4 is a tail or foot piece 7 adapted to engage the bottom of the salt shaker to support the device therein. This piece is relatively thin in cross section, as appears in Figure 4, and is made of material, such as plastic, whereby it may be easily cut to a length so that the perforations in the upper portion of the body 4 will be supported above the level of the salt, designated 8, in the shaker. If desired, the entire device may be made of plastic and the depending tail member may be formed as an integral part thereof.

The upper end of the body 4 is preferably provided with a removable cap 9 which, like the body, is also formed with perforations 6. The cap is conveniently formed with a flange 10 which overlappingly engages a similar upstanding flange 11 on the body. While the parts may be made so that the flanges thereof will so snugly engage each other that friction between the coacting surfaces of the parts may alone be relied upon to hold them together, suitable cement is preferably employed between the flanges to maintain the parts in assembled position while the device is in use.

Projecting upwardly from the cap is a rod-like member 12 which is adapted to engage the top of the shaker when it is inverted in being used. This member serves to maintain the body of the device in spaced relation to the cap of the shaker when the latter is inverted so as to prevent the body from possibly closing the perforations in the cap and thereby preventing discharge of salt from the shaker. The size of the upper portion of the body is such that the salt within the shaker will pass freely around the body and thus through the perforations in the cap.

In Figure 2 the moisture absorbing device is shown as being centered between the walls of the salt shaker, being held against lateral movement by the salt within the shaker. This is the position the device may assume when it is centrally inserted in a shaker already having salt or if it is held in a central position while the shaker is being filled with salt. When the shaker is used, however, the moisture holding device will probably move into engagement with one of the walls thereof but it will still be supported in a substantially upright position, with the perforations therein above the salt level, by the tail or foot piece 7.

As may be seen from Figure 1, the supporting member 7 preferably tapers downwardly from the body 4 whereby it may advantageously be substantially spear shape and thus readily penetrate the salt so that the device as a whole will tend to move downwardly after the shaker is used until the tail piece rests upon the bottom of the shaker.

By supporting the moisture absorbing device in the salt shaker so that the perforations in the body for receiving the moisture absorbing agent are disposed above the level of the salt, it will be appreciated that moisture in the air in the space between the cap 2 and the level of the salt will be directly absorbed while any moisture in the salt itself will be absorbed through the other perforations which are below the salt level.

Various modifications may be made in the details of the device here illustrated and described without departing from the spirit and scope of the invention as defined in the appended claims.

What we claim is:

1. A device adapted to be loosely confined in a salt shaker for absorbing moisture therein, comprising a perforated container for housing a moisture absorbing agent, said perforations extending through the wall of said container and affording open communication between the interior of the container and the interior of the shaker when the device is installed therein, and a member attached to the lower portion of said container for maintaining the upper end of said body in a position adjacent the upper end of the shaker when the device is installed in said shaker.

2. A device adapted to be loosely confined in a salt shaker for absorbing moisture therein, comprising a perforated container for housing a moisture absorbing agent, said perforations extending through the wall of said container and affording free communication between the interior of the container and the interior of the shaker when the device is installed therein, a member extending from one end of said container for maintaining the upper end thereof in the upper end of the shaker, and means extending from the other end of said body towards the top of the shaker and engageable therewith when the device is installed in the shaker and said shaker is inverted.

JOHN W. MORSE.
JOSEPH PEARLSTEIN.

REFERENCES CITED

The following references are of record in the file of this patent:

UNITED STATES PATENTS

| Number | Name | Date |
|---|---|---|
| 871,803 | Kendall | Nov. 26, 1907 |
| 1,252,872 | Yoggerst et al. | Jan. 8, 1918 |
| 1,274,597 | Reilly | Aug. 6, 1918 |
| 1,947,600 | Isenhower | Feb. 20, 1934 |

FOREIGN PATENTS

| Number | Country | Date |
|---|---|---|
| 518,027 | Germany | Feb. 11, 1931 |
| 572,751 | France | Jan. 12, 1924 |